(12) United States Patent
Fahldieck

(10) Patent No.: US 8,225,923 B2
(45) Date of Patent: Jul. 24, 2012

(54) PET BOTTLE GRIPPER

(75) Inventor: Andreas Fahldieck, Idar-Oberstein (DE)

(73) Assignee: KHS GmbH, Dortmund (DE)

( * ) Notice: Subject to any disclaimer, the term of this patent is extended or adjusted under 35 U.S.C. 154(b) by 22 days.

(21) Appl. No.: 12/991,067

(22) PCT Filed: Apr. 24, 2009

(86) PCT No.: PCT/EP2009/003003
§ 371 (c)(1),
(2), (4) Date: Nov. 4, 2010

(87) PCT Pub. No.: WO2009/135597
PCT Pub. Date: Nov. 12, 2009

(65) Prior Publication Data
US 2011/0089003 A1   Apr. 21, 2011

(30) Foreign Application Priority Data

May 8, 2008   (DE) .......................... 10 2008 022 848

(51) Int. Cl.
*B65G 29/00*   (2006.01)
(52) U.S. Cl. .................................. 198/476.1; 198/470.1
(58) Field of Classification Search ............... 198/470.1, 198/474.1, 476.1, 478.1, 867.05, 867.07, 198/803.7, 803.9
See application file for complete search history.

(56) References Cited

U.S. PATENT DOCUMENTS

| 3,863,753 | A | * | 2/1975 | Shank, Jr. ..................... 198/680 |
| 3,944,058 | A | * | 3/1976 | Strauss ....................... 198/476.1 |
| 4,036,353 | A | * | 7/1977 | Suter .......................... 198/803.9 |
| 4,055,943 | A | * | 11/1977 | Reichert ......................... 53/247 |
| 4,169,621 | A | * | 10/1979 | McGill ......................... 294/116 |
| 4,944,353 | A | * | 7/1990 | Shishkin et al. ................ 172/23 |
| 5,607,045 | A | * | 3/1997 | Hermann Kronseder . 198/476.1 |
| 6,079,541 | A | * | 6/2000 | Bercelli et al. ............. 198/470.1 |
| 6,938,753 | B2 | * | 9/2005 | Bonatti et al. ............. 198/470.1 |
| 2004/0065525 | A1 | | 4/2004 | Bonatti |

FOREIGN PATENT DOCUMENTS

| DE | 1482616 | 1/1969 |
| DE | 24 18 980 | 11/1974 |
| DE | 297 13 510 | 7/1997 |
| DE | 20 2006 004 641 | 10/2007 |
| DE | 20 2006 018 379 | 6/2008 |
| JP | 11-236095 | 8/1999 |
| WO | 03/078285 | 9/2003 |

* cited by examiner

*Primary Examiner* — James R Bidwell
(74) *Attorney, Agent, or Firm* — Occhiuti Rohlicek & Tsao LLP

(57) ABSTRACT

In a bottle filling installation, an apparatus for gripping PET bottles when transferring bottles from a spider element to a spider element/ filling element/rinsing element includes a thrust body that opens and closes grippers; a guide, which is vertical in the operational position, that engages the thrust body; a first spring for exerting a force on the body in a lifting and lowering direction; and a roller for moving the thrust body around a control curve.

10 Claims, 6 Drawing Sheets

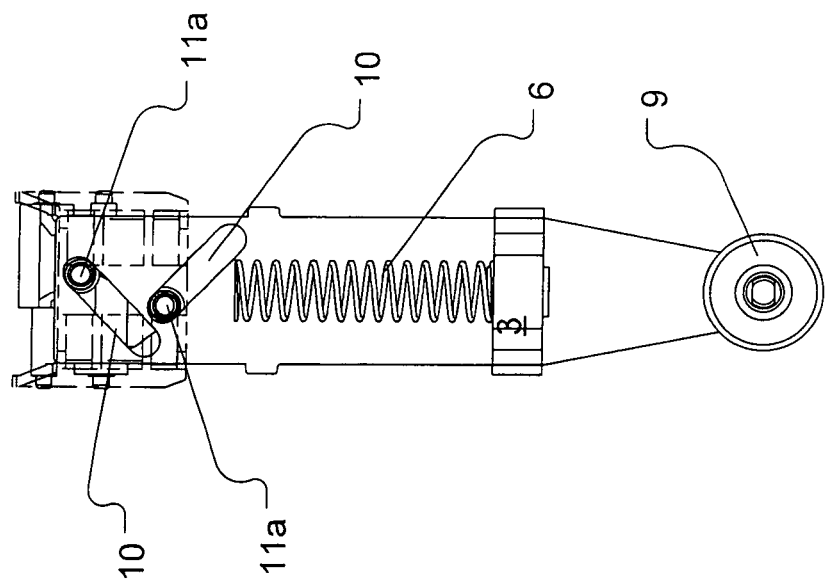
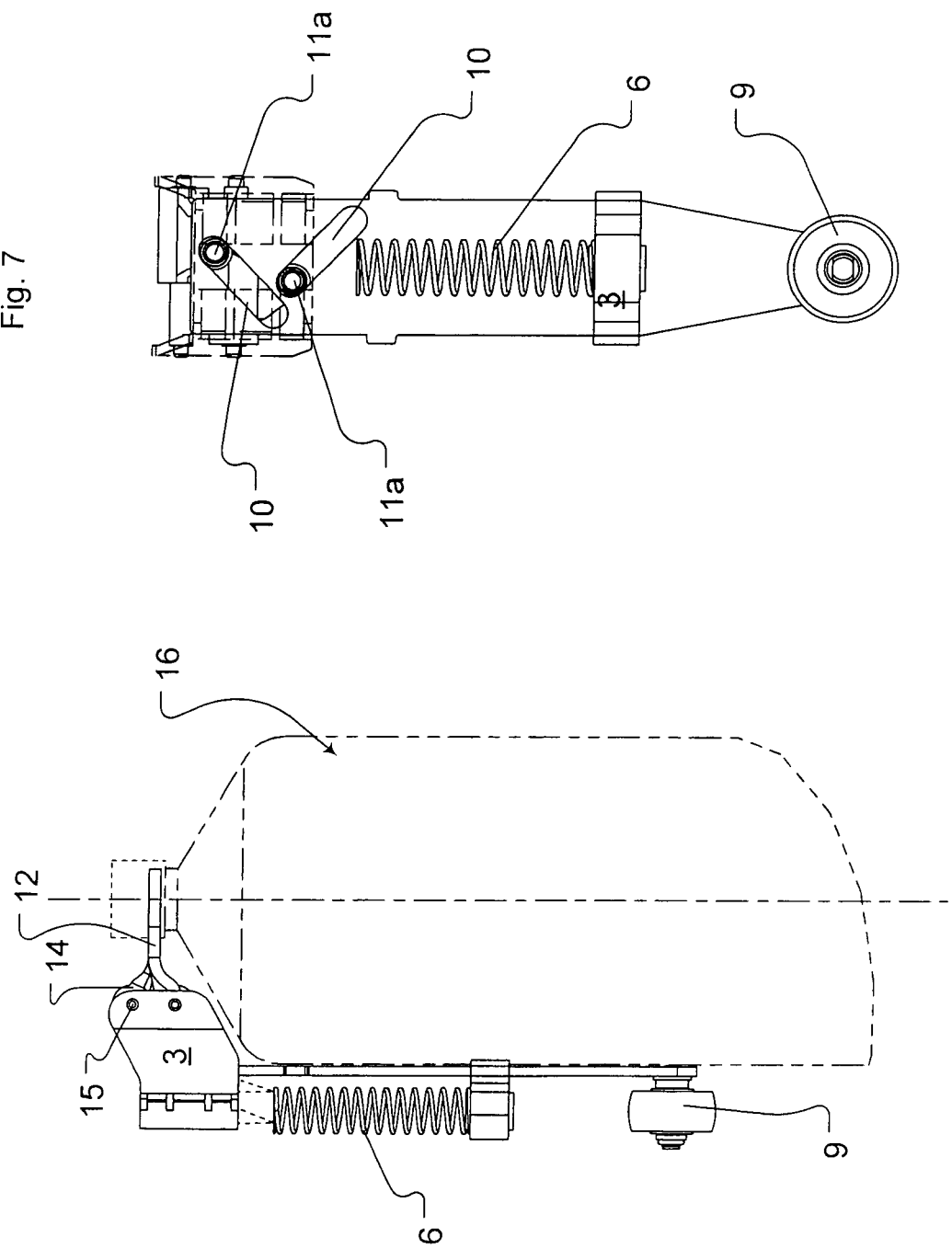

PET BOTTLE GRIPPER

CROSS-REFERENCE TO RELATED APPLICATIONS

This application is the National Stage of International Application No. PCT/EP2009/003003, filed on Apr. 24, 2009, which claims the benefit of German Application Serial No. 10-2008 022 848.6, filed on May 8, 2008, the contents of both of the foregoing applications are hereby incorporated by reference in their entirety.

FIELD OF DISCLOSURE

The invention relates to a device for gripping PET bottles in bottle filling installations, in particular for transferring from the spider element to the spider element/filling element/rinsing element or similar.

BACKGROUND

Grippers for bottles or other containers in filling installations are known in various designs, for example from utility models DE 297 13 510 U or DE 20 2006 018 379 U1, in which with intermediate positioning of a swivel joint, an actuating end is assigned to each gripper end of both gripper arms, between which e.g. an eccentric cam or similar is pivot-mounted, in order thus to effect an open position and a closed position respectively. Deformable plastic gripper arms are known from DE 20 2006 004 641, but these do not have their own drive for active movement.

SUMMARY

The invention is based on the problem of creating a gripper device with which it is possible, as is specifically required in the case of PET bottles when said bottles are e.g. filled with hot liquids and are therefore easily deformable, to achieve different gripping strengths without complex equipment.

Using a device of the type described above, this problem is solved by a thrust body that opens and closes grippers which is provided on a guide, which is vertical in the operational position, a force being exerted on said body in the lifting and lowering direction by at least one spring and the body being moved around a control curve by means of a roller.

This design makes it possible to move such a device, depending on the position of the thrust body, between the two springs into a passive central position which exerts sufficient pressure of the gripper arms for e.g. empty PET bottles. The gripping pressure can be increased by active lifting, e.g. via the control curve, possibly to release bottles from passive clips or to transport full bottles. Active lowering of the thrust body allows the grippers to be opened in simple fashion, perhaps to transfer the bottles in turn into passive clips.

One very special advantage of the invention lies in the fact that due to the design of the gripping arms, there is no need to change any elements in order to grip PET bottles of differing neck diameters, such as bottles with a small diameter of, for example, 23 mm up to bottles of a large neck diameter, e.g. of 43 mm, without the invention being limited to these diameter figures.

Embodiments of the invention ensue from the sub claims. Provision can then be made that guides are assigned to the thrust body with a functional connection to each gripper in order to exert the opening and closing movement.

An extremely simple, suitable constructive design of the device consists in the fact that the guides are configured as slots in a V-shape or aligned at an angle to each other in a control plate assigned to the thrust body. In these slots, e.g. actuation ends of the gripper arms can be guided in order to effect the opening or closing.

One suitable particular embodiment of the invention consists in the fact that two springs acting on the thrust body have different spring constants and/or spring pre-tensions. So the springs acting in the closing direction for holding with increased gripping pressure can be "strong springs", while the springs effecting the closing movement of the gripper arms to hold with normal gripping pressure can be "weak springs".

As the movement of the thrust body occurs via a control curve, the control curve can be designed e.g. so that it can be adjusted automatically by means of a pneumatic drive, and it can also be adjusted manually.

As can be seen, no neck or other guides are necessary for the transfer from spider element to spider element/conveyor-rinsing element, while it is guaranteed that the bottle centre point always lies on the pitch circle.

Due to the particular spring action it is also possible that when there is a high radial force effect, due e.g. to changes in the pitch circle of the filling element when becoming hot, the grippers can open a little without being damaged, while the spring loading also guarantees that the grippers hold the bottle sufficiently securely even in uncontrolled condition.

An especially compact and simple construction of the device according to the invention is achieved by a modified exemplary embodiment, which is characterised in that the thrust body with roller is formed directly by the control plate. If, as provided according to the invention, the control plate itself is equipped with the roller driving the guide surfaces for opening and closing the gripper around the control curve, this achieves an especially compact and space-saving construction of the active grippers according to the invention.

In a further embodiment, provision can be made that the grippers are equipped at their actuation end with slide bushes, whereby the slide bushes have actuation fingers guided so as to slide in the slots with rollers and are arranged on slide rods positioned transverse to the control plate.

The invention is explained in more detail below by way of example on the basis of the drawing. The drawing shows, in

DETAILED DESCRIPTION

Figure 1:
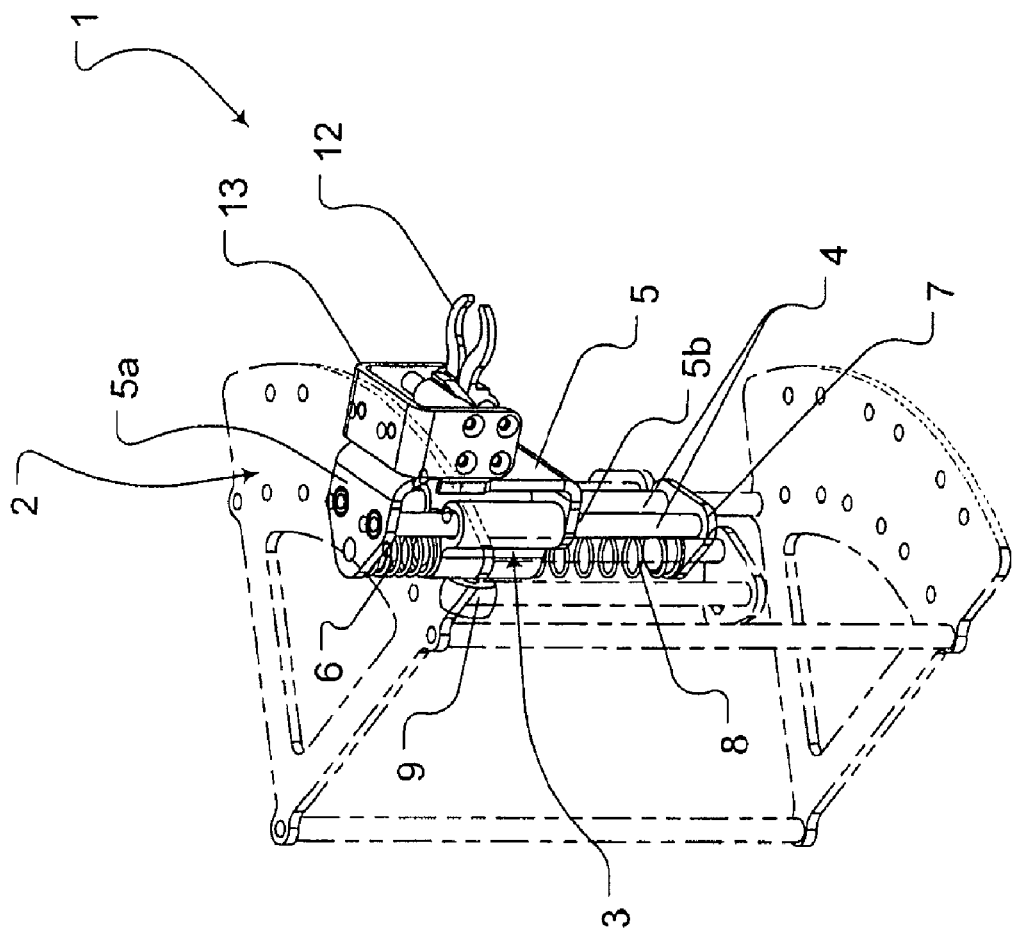
FIG. 1 a spatial view of the device in an indicated installed situation.

The device, generally referred to as 1, is for example part of a bottle filling installation, which is not shown in more detail, merely indicated by a dotted illustration of an installation element 2.

The device has a thrust body 3, which is mounted so as to slide on two horizontally positioned guide rods 4, together with a control plate 5 surrounding the thrust body 3, somewhat U-shaped in lateral view, which is likewise displaceable along the guide rods 4.

As can be seen from the figures, a first spring 6 is positioned between thrust body 3 and the upper U-leg 5a of the control plate 5, while a further spring 8 is tensioned between a bearing 7 on the lower side of the guide rods 4 and the lower U-leg 5b.

The thrust body 3 has a roller 9, which acts on the control curves (not shown), in order thereby to effect a forced movement of the thrust body 3 into different positions.

The thrust body 3 is freely movable between the U-legs 5a and 5b of the control plate 5, such that when the thrust body 3 is raised off and lowered onto guide rods 4, due to the force of the respective spring 6 and/or 8 the control plate is synchronously raised or lowered therewith.

Figure 2:
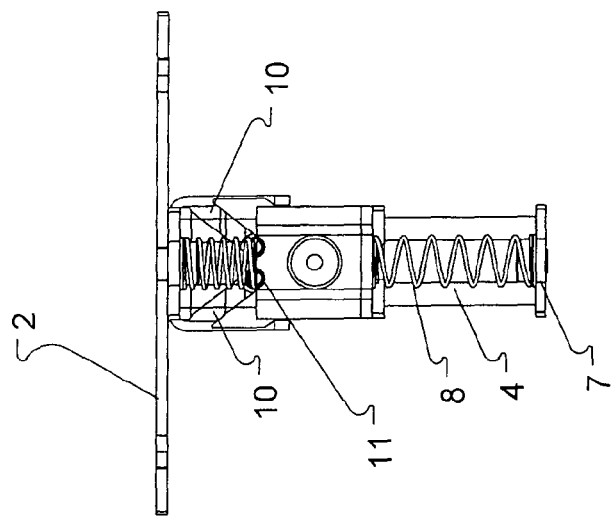
FIGS. 2 to 4 the device in two lateral views in different actuation positions with associated position of the grippers, FIG. 5 a spatial view of the device according to a different embodiment and in FIGS. 6 and 7 lateral views of part of the device according to FIG. 5.
Figure 2:
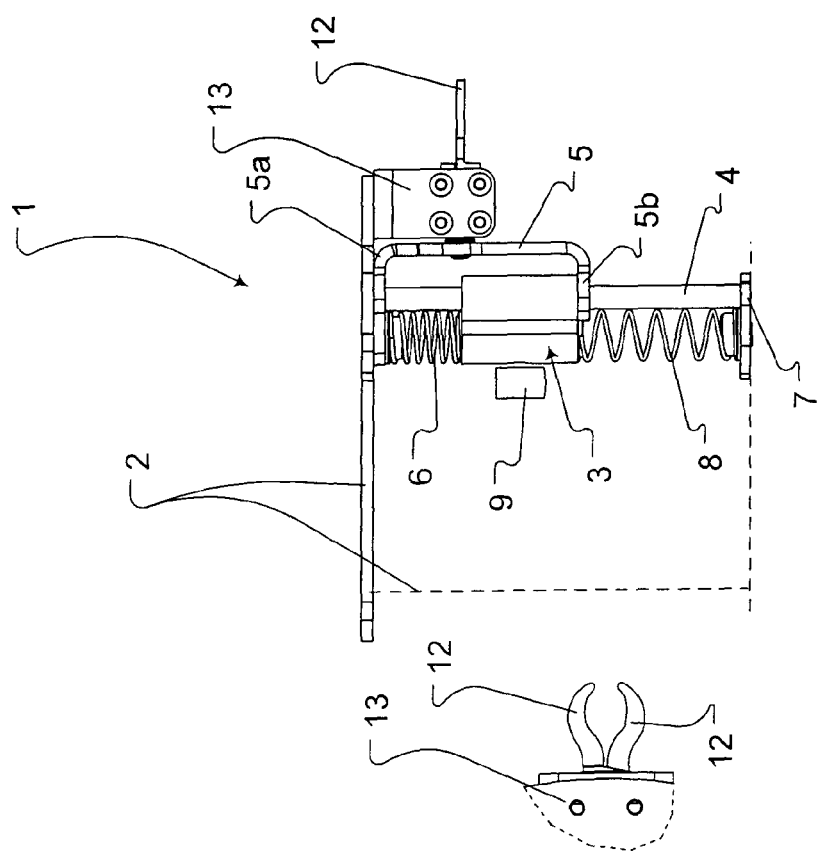
Figure 3:
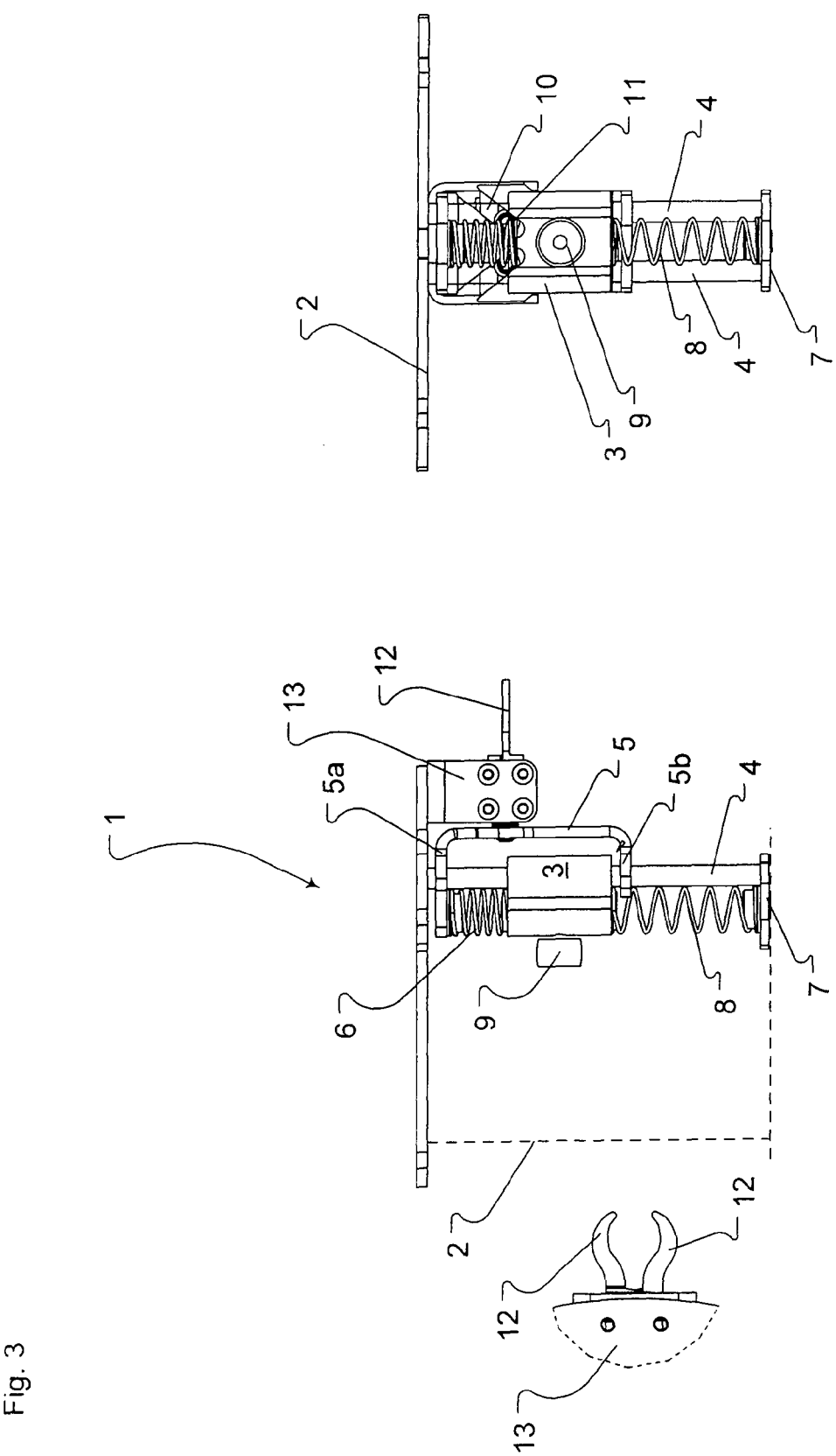
Figure 4:
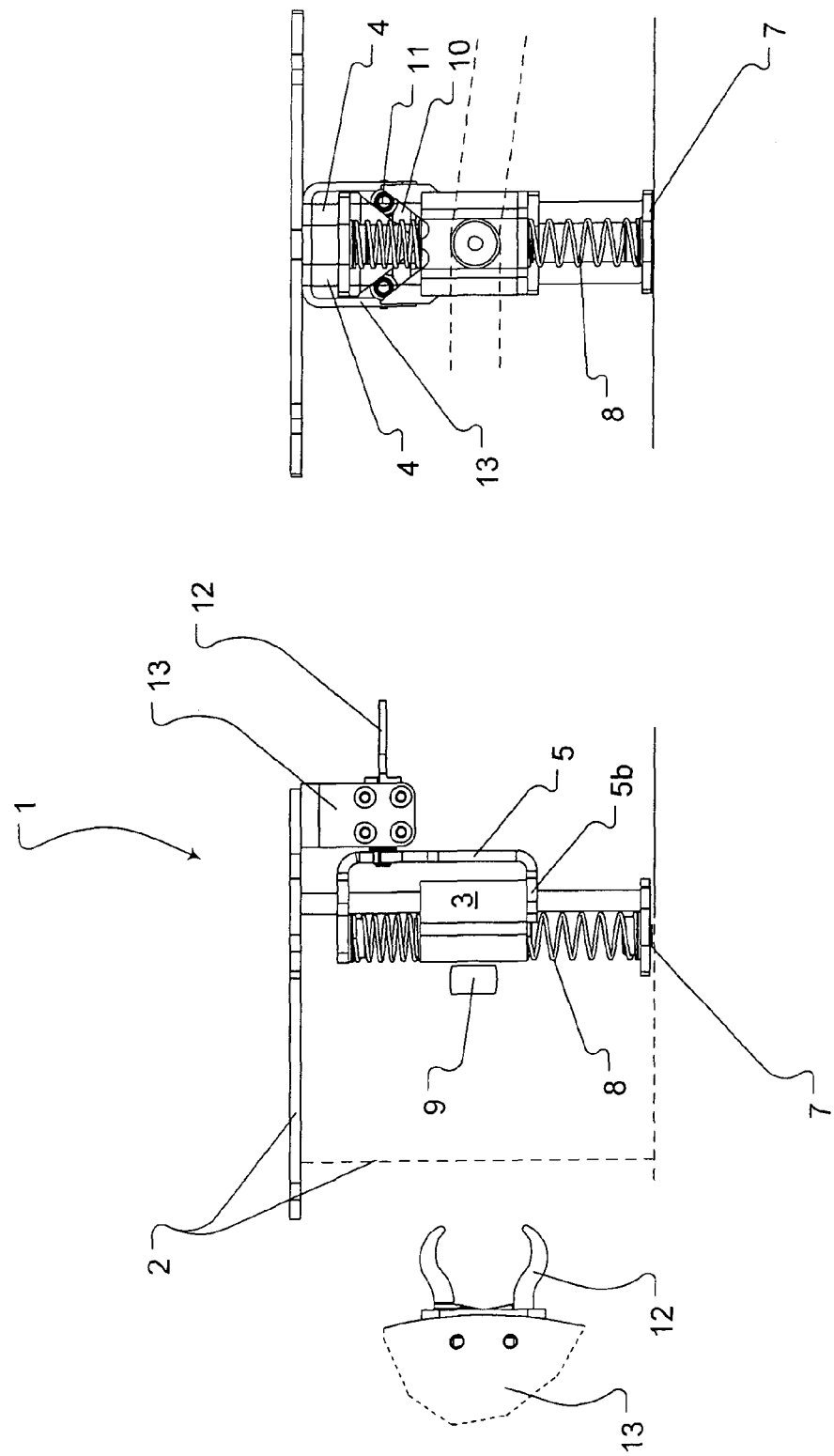

In the control plate 5, as is especially apparent from FIGS. 2 to 4, V-shaped indicated slots 10 are provided, in which the actuation ends 11 of the grippers 12 engage, while the grippers 12 are positioned in a bearing element 13, which is fixed to the element 2 of the filling installation.

Due to the raising and lowering of the thrust body 3 caused by the roller wheel 9 rolling away on the control curve, the control plate 5 is likewise moved up and down, so that the actuation ends 11 are forced to move in the inclined slots 10, in such a way that the grippers 12 open or close.

FIGS. 2 to 4 show different working positions. So FIG. 2 shows the thrust body 3 in its upper position, in which the spring 6 is compressed such that a sufficient gripping force is exerted by the grippers 12, for example to be able to take bottles (shown by dotted lines in FIGS. 5 and 6 and designated as 16) out of a container or else to transport filled bottles 16.

FIG. 3 shows a central position, in which the grippers 12 are still essentially maintained in their closed position, although with lesser closing force, while FIG. 4 shows the opening position with thrust body 3 fully lowered against the force of the spring 8.

Figure 5:
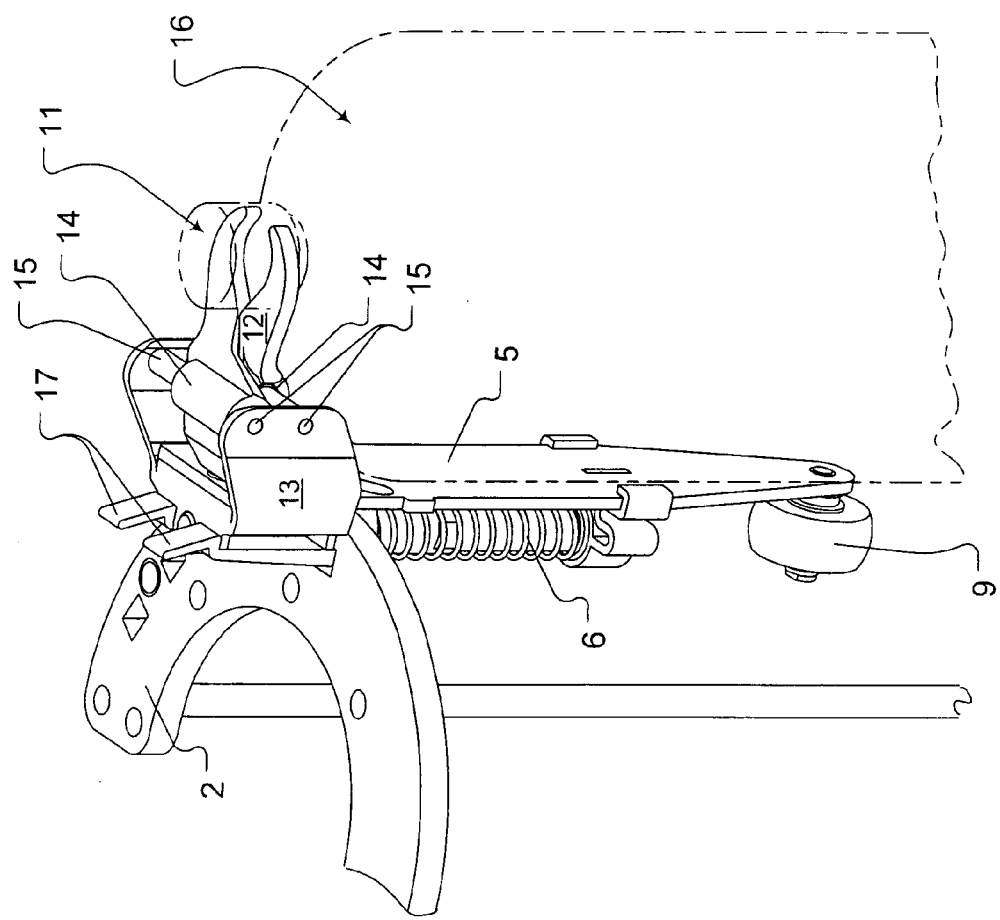

FIGS. 5 to 7 show part of a modified exemplary embodiment of the invention, in which some of the elements have been omitted for illustration purposes.

The elements functionally equivalent to those in the embodiment according to FIGS. 1 to 4 also bear the same reference numbers here, even when they have been slightly modified in terms of construction.

As can be seen, the roller 9 is directly supported by the control plate designated as 5, while slots 10 are provided in the control plate 5, standing at an angle to each other, in which pins with rollers 11a engage which are provided on slide bushes 14 connected to the actuation end 11 of the grippers 12 and can be displaced on sliding rods 15 transverse to the control plate 5. The opening movement of the grippers 12 is effected by raising the control plate with the aid of the roller wheel 9, the grippers 12 being closed by the spring 6.

As is especially apparent from FIG. 5, the device 1 according to the invention is fixed to the corresponding machine elements 2 by clips 17 and so can be replaced without tools. The guide bolts 15 for the slide bush 14 are only clipped into the bearing element 13, so that they are easy to replace and simultaneously serve as "predetermined breaking points", when too great a load is exerted by the grippers 12.

Since the entire construction can easily be dismantled, it is possible to adapt the construction to varying neck ring thicknesses, for example by placing a disc underneath, so that the height of the grippers can be adjusted accordingly for a thicker neck ring.

Naturally the exemplary embodiment of the invention described can still be modified in many ways, without departing from the basic concept. So, in particular, the invention is not limited to the guide shown for the thrust body; this can also be positioned on a push rod, which, for example, simultaneously forms the core guide of both springs 6 and 8 and which is provided at its lower end with a roller for running around a control curve and so forth.

The invention claimed is:

1. In a bottle filling installation, an apparatus for gripping PET bottles when transferring bottles from a spider element to a spider element/filling element/rinsing element, said device comprising
    a thrust body that opens and closes grippers;
    a guide, which is vertical in the operational position, said guide engaging said thrust body;
    at least a first spring for exerting a force on said body in a lifting and lowering direction; and
    a roller for moving the thrust body around a control curve.

2. The apparatus of claim 1, further comprising guides for providing said thrust body with a functional connection to each gripper in order to open and close said grippers.

3. The apparatus of claim 2, further comprising a control plate coupled to said thrust body, wherein said guides comprise walls forming slots in said control plate coupled to said thrust body.

4. The apparatus of claim 1, further comprising a second spring, wherein said first and second springs have different spring constants.

5. The apparatus of claim 3, wherein said the control plate comprises a U-shaped portion, and wherein said first spring is positioned between a U-leg of the control plate and the thrust body.

6. The apparatus of claim 3, wherein said thrust body with said roller is directly formed by the control plate.

7. The apparatus of claim 3, wherein the grippers comprise slide bushes at actuation ends thereof, said slide bushes
    having actuation pins with rollers guided so as to slide in the slots and
    being arranged on slide rods positioned transverse to the control plate.

8. The apparatus of claim 3, wherein said slots are arranged in a V-shape.

9. The apparatus of claim 3, wherein said slots are arranged at an angle to each other.

10. The apparatus of claim 1, further comprising a second spring, wherein said first and second springs have different spring pre-tensions.

* * * * *